April 22, 1952     M. C. GODFREY     2,593,747
FISHING REEL LOCK
Filed Sept. 23, 1947
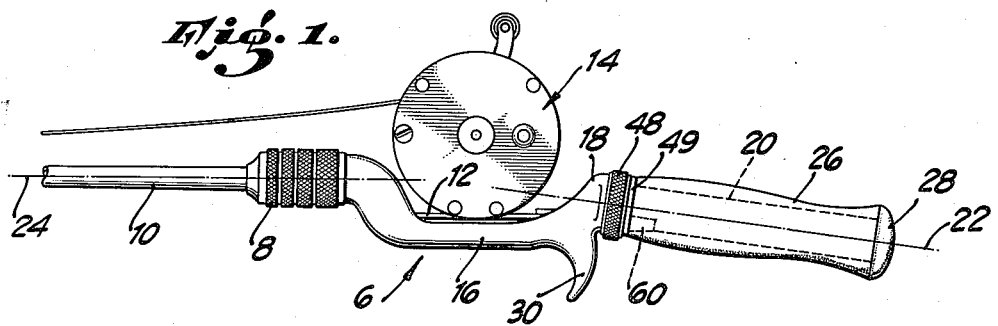
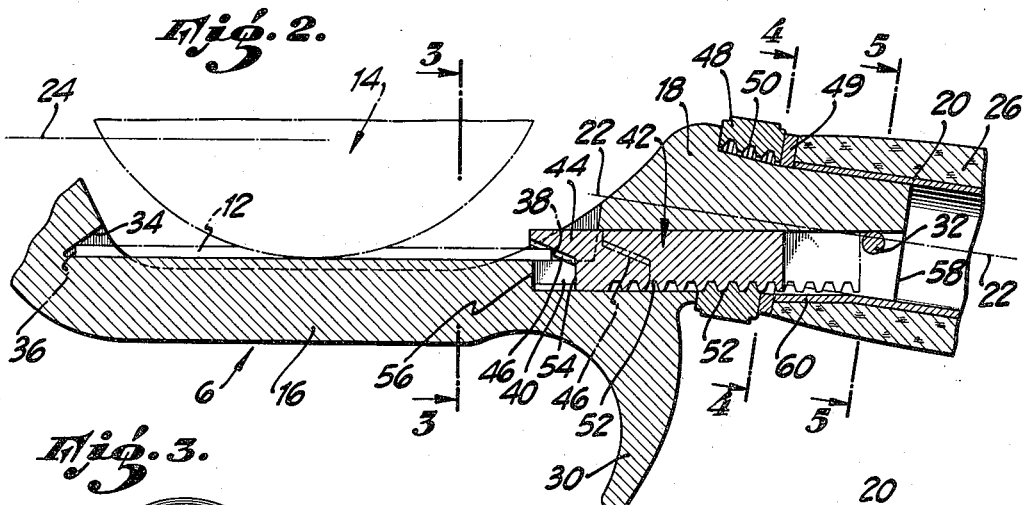
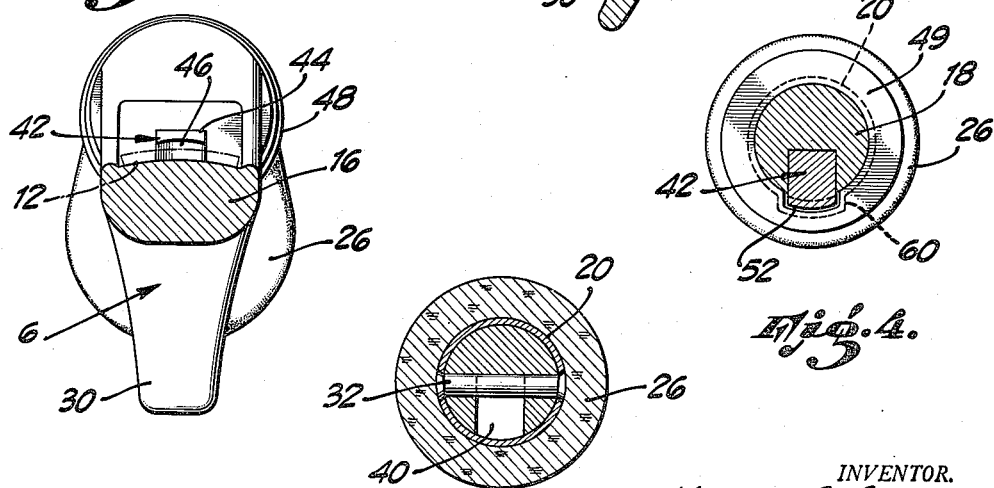
INVENTOR.
MELVIN C. GODFREY
BY John Ham
ATTORNEY.

Patented Apr. 22, 1952

2,593,747

UNITED STATES PATENT OFFICE 2,593,747

FISHING REEL LOCK

Melvin C. Godfrey, Los Angeles, Calif., assignor, by mesne assignments, to Narmco, Inc., San Diego, Calif., a corporation of California Application September 23, 1947, Serial No. 775,574

5 Claims. (Cl. 43—22)

This invention relates to a fishing rod and reel, and more particularly to a structure for securing the reel firmly to the handle, or butt portion, of the rod.

It is one of the objects of this invention to provide a reel lock that is simple and inexpensive, and capable of being readily manufactured in quantity.

It is another object of this invention to provide a reel lock that is compactly embodied in the handle structure, the lock proper being movable in the grip portion, there being no parts of the lock that can interfere with the free use of the hands in manipulating the rod in casting and reeling.

This invention possesses many other advantages, and has other objects which may be made more clearly apparent from a consideration of one embodiment of the invention. For this purpose there is shown a form in the drawings accompanying and forming part of the present specification. The form will now be described in detail illustrating the general principles of the invention; but it is to be understood that this detailed description is not to be taken in a limiting sense, since the scope of this invention is best defined by the appended claims.

Referring to the drawings:

Figure 1 is an elevation of a fishing rod and reel incorporating the invention;

Fig. 2 is an enlarged longitudinal sectional view, showing in detail the pertinent structure of this invention, the locking mechanism being shown in engaging position, and the dotted lines indicating the retracted position;

Fig. 3 is a sectional view, taken along the plane 3—3 of Fig. 2;

Fig. 4 is a sectional view, taken along the plane 4—4 of Fig. 2; and

Fig. 5 is a sectional view, taken along the plane 5—5 of Fig. 2.

In this instance, the invention is shown as embodied in an apparatus including a handle body 6, conveniently made as a casting. This handle body 6 carries at one end a socket member 8, which includes a resilient collet of the usual type, which may be contracted for gripping. This socket member is adapted detachably to grasp the base portion of the rod proper 10. The handle body 6 has its central portion 16 offset in order to form a seat for the base 12 of a fishing reel 14 at a place adjacent the locking mechanism.

The body 6 has an integral conical extension 18 adapted to project into a substantially tubular handle portion 20. This handle portion 20 has an axis 22 slightly inclined to the axis 24 of the rod 10 for purposes of comfort and convenience in handling. The handle portion 20 is suitably provided with a cork grip 26 telescoped over the handle portion 20, and a rubber cap 28 is secured in a suitable manner within the end of the handle portion. This handle thus forms the butt end of the rod. For the convenience of the user, a finger rest 30 is formed as part of the body 6. The extension 18 of the body 6 is secured to the handle portion 20 by a pin 32 extending through both the handle 20 and the extension 18.

As illustrated in Fig. 2, the base 12 of the fishing reel 14 is placed upon the seat 16. For this purpose, this seat has a convex configuration on its upper side, as illustrated in Fig. 3, in order to conform to the contour of the reel base 12. A recess 34, having an overhanging wall, is formed in the handle body 6 adapted to receive one edge 36 of the reel base 12.

The opposite edge 38 of the reel base 12 projects over a substantially rectangular channel 40 formed in the handle body 6. This channel has a portion 58 that is open outwardly of the extension 18. Movable within this channel, and guided therein, is a lock bar 42 which has substantially the same cross section as the channel. This lock bar 42 has a lip 44 which forms an inclined surface 46 adapted to engage and overlie the base 12 of the reel 14. As shown most clearly in Fig. 3, this surface is concave to fit the edge 38. Thus, the reel 14 is secured by having its base 12 confined by the sloping wall of the recess 34 and the surface 46, as shown by the full line position of Fig. 2. The left-hand end of the tubular handle 20 is formed with a lower sloping lip 60 to permit movement of the lock bar 42, with respect to the tube 20, at an angle to the axis 22 of this tube 20.

In order to provide conveniently for the movement of the lock bar 42, a nut 48 extends around the conical extension 18 immediately forward of the handle portion 20. A washer 49 provides a metal thrust bearing surface for the nut 48, and it also retains the nut in assembled position. The nut 48 is provided with tapered threads 50, and is rotatable about the axis 22. The degree of taper corresponds to the angle between the axes 22 and 24. Thread portions 52 are provided on the bottom portion of the lock bar 42, and which are engaged by the nut threads. Thus, rotation of the nut 48 about the axis 22 moves the lock bar 42 substantially in the direction of the axis 24 of the rod 10 and in the direction of the reel base 12 and the seat therefor.

In assembling the handle body 6, the lock bar 42, and the associated parts of this device, the lock bar 42 is inserted into the channel 40 through the open end 58 thereof. The nut 48 is then projected over the conical extension 18 and threaded onto the lock bar 42. The washer 49 is then projected over the extension 18. Finally, the handle portion 20 is telescoped over the extension 18 and pinned in place by the pin 32.

In order to limit the maximum retraction of the lock bar 42, the pin 32 is appropriately placed to serve as a stop for the lock bar 42. Forward movement of the lock bar 42 is limited by the vertical surface 54 of the lock bar and the corresponding surface 56 of the channel 40, which forms a shoulder for the lock bar 42. Thus, when the apparatus is assembled, the movable lock member 42 cannot be removed either forcibly or accidentally; since the surface 56 and the pin 32 restrict the position of the lock bar 42 so that some portion of the threads 52 thereon is in engagement with the tapered threads 50 of the nut 48.

The mechanism as above described provides a simple, readily manipulable, reliable, and conveniently placed reel locking device.

The inventor claims:

1. In a fishing rod handle adapted to hold a reel having a base: a body forming a handle portion and a seat for the base; said seat at one end having an overhanging wall beneath which one end of the base can be inserted; a lock bar having an inclined face adapted to engage the other end of the base, said bar having threads on only a portion of its periphery, said body having a channel for slidably accommodating said bar; the handle portion having an axis slightly inclined to the direction of movement of the bar, and having a conical surface; a nut having tapered threads and mounted on said conical surface and engaging the threads on the bar, the taper of the threads in the nut being such that the bar is moved by rotation of the nut in a direction parallel to the seat; means restraining axial movement of the nut; and a stop carried by the handle portion to limit the movement of the bar in reel releasing direction.

2. In a fishing rod handle adapted to hold a reel having a base: a body forming a handle portion, as well as a seat for the base, said seat at one end having an overhanging wall beneath which one end of the base can be inserted; a locking bar slidable on said body and engageable with the other end of the base, said bar having threads on only a portion of its periphery; the handle portion having an axis slightly inclined to the direction of movement of the bar and having a conical surface; a nut having tapered threads, and mounted on said conical surface, and engaging the threads on the bar; means restraining axial movement of the nut; and a stop carried by the handle portion to limit the movement of the bar in reel releasing direction.

3. In a holder for a reel having a base: a handle body having a rest for receiving said base; a grip portion on said body; means movably supported within the handle body and said grip portion for locking said base on said rest; and transversely extending stop means securing said grip portion to said body and limiting the movement of said locking means within said grip portion and said handle body.

4. In a holder for a reel having a base: a handle body having a rest for receiving said base; a grip portion on said body; means movably supported by the handle body for locking said base on said rest; and a transversely extending pin securing said grip portion to said body and engageable with said locking means to limit its movement on said body.

5. In a holder for a reel having a base: a handle body forming a seat for said reel base; a grip portion secured to said handle body, said grip portion having an axis inclined with respect to said seat; said handle including means forming a space within said grip portion and the handle body; a lock bar slidably movable in said space and guided by said means, said lock bar being movable in a direction parallel to said seat, said lock bar having threads thereon and a projecting lip portion for engaging said reel base; and a nut extending around said handle portion and rotatable about said axis of said grip portion, said nut having internally tapered threads for engaging said threads on said lock bar for moving said lock bar.

MELVIN C. GODFREY.

REFERENCES CITED

The following references are of record in the file of this patent:

UNITED STATES PATENTS

| Number | Name | Date |
|---|---|---|
| 55,109 | Jackson | May 29, 1866 |
| 334,085 | Otstot | Jan. 12, 1886 |
| 600,813 | Van Duijl | Mar. 15, 1898 |
| 667,392 | Hodgman | Feb. 5, 1901 |
| 2,000,263 | Teetor | May 7, 1935 |
| 2,057,535 | McKechnie | Oct. 13, 1936 |
| 2,236,603 | Nelson | Apr. 1, 1941 |
| 2,260,204 | Baltz et al. | Oct. 21, 1941 |
| 2,424,430 | Beyer | July 22, 1947 |